US006270901B1

(12) United States Patent
Parsonage et al.

(10) Patent No.: US 6,270,901 B1
(45) Date of Patent: Aug. 7, 2001

(54) COMPOSITIONS FOR BONDING FLUOROPLASTICS

(75) Inventors: Edward E. Parsonage, St. Paul; Robert E. Kolb, Afton; Jerry L. Bymark, Hastings, all of MN (US)

(73) Assignee: Dyneon LLC, Oakdale, MN (US)

( * ) Notice: Subject to any disclaimer, the term of this patent is extended or adjusted under 35 U.S.C. 154(b) by 0 days.

(21) Appl. No.: 09/207,720

(22) Filed: Dec. 8, 1998

Related U.S. Application Data

(60) Provisional application No. 60/068,321, filed on Dec. 19, 1997.

(51) Int. Cl.$^7$ ............... B32B 25/08; B32B 25/14; B32B 25/16; B32B 25/18; B32B 25/20
(52) U.S. Cl. ............... 428/421; 428/515; 428/519; 428/520; 428/521; 428/522
(58) Field of Search ............... 428/421, 422, 428/515, 519, 520, 521, 522; 156/307.1, 307.7

(56) References Cited

U.S. PATENT DOCUMENTS

| | | | |
|---|---|---|---|
| 3,158,580 | 11/1964 | Vandenberg | 260/2 |
| 3,158,581 | 11/1964 | Vandenberg | 260/2 |
| 3,726,841 | 4/1973 | Mirolli et al. | 260/79 |
| 4,233,421 | 11/1980 | Worm | 525/343 |
| 4,287,322 | 9/1981 | Worm | 525/403 |
| 4,335,238 | 6/1982 | Moore et al. | 526/254 |
| 4,606,952 | 8/1986 | Sugimoto et al. | 428/36 |
| 4,912,171 | 3/1990 | Grootaert et al. | 525/340 |
| 4,933,060 | 6/1990 | Prohaska et al. | 204/192.36 |
| 5,047,287 | 9/1991 | Horiuchi et al. | 428/248 |
| 5,081,172 | 1/1992 | Chaffee et al. | 524/188 |
| 5,086,123 | 2/1992 | Guenthner et al. | 525/276 |
| 5,170,011 | 12/1992 | Martucci | 174/47 |
| 5,242,976 | 9/1993 | Strassel et al. | 525/72 |
| 5,262,490 | 11/1993 | Kolb et al. | 525/343 |
| 5,284,184 | 2/1994 | Noone et al. | 138/121 |
| 5,320,888 | 6/1994 | Stevens | 428/36.2 |
| 5,383,087 | 1/1995 | Noone et al. | 361/215 |
| 5,427,831 | 6/1995 | Stevens | 428/36.2 |
| 5,512,225 | 4/1996 | Fukushi | 264/127 |
| 5,658,670 | 8/1997 | Fukushi et al. | 428/421 |

FOREIGN PATENT DOCUMENTS

| | | |
|---|---|---|
| 0 185 590 | 6/1986 | (EP) . |
| 0 303 244 A2 | 2/1989 | (EP) . |
| 0 523 644 | 1/1993 | (EP) . |
| 0 551 094 | 7/1993 | (EP) . |
| 0 759 354 A1 | 2/1997 | (EP) . |
| WO 99/00454 | 1/1999 | (WO) . |

OTHER PUBLICATIONS

Database WPI, Section Ch, Week 8344, Derwent Publications Ltd., London, GB; AN 83–805331; XP002096396 & JP 58 162336 A (Tokai Rubber Ind Ltd) Sep. 27, 1983, See Abstract.

Database WPI, Section Ch, Week 8344, Derwent Publications Ltd., London, GB; AN 83–805330; XP002096397 & JP 58 162335 A (Tokai Rubber Ind Ltd) Sep. 27, 1983, See Abstract.

John Scheirs (Ed.): "Modern Fluoropolymers, High Performance Polymers for Diverse Applications" 1997, John Wiley & Sons, Chichester, GB, XP002096142, see page 600, line 25—page 602, line 4–5.

ASTM D–1876, Standard Test Method for Peel Resistance of Adhesives.

ASTM D–1976, Standard Test Method for Elements in Water by Inductively–Coupled Argon Plasma Atomic Emission Spectroscopy.

Brullo, R. A., "Fluoroelastomer Rubber for Automotive Applications", *Automotive Elastomer & Design*, Jun. 1985.

Brullo, R. A., "Fluoroelastomers Seal Up Automotive Future", *Materials Engineering*, Oct., 1988.

F. W. Billmeyer, *Textbook of Polymer Science*, 3$^{rd}$ ed., pp. 398–403, John Wiley & Sons, New York (1984).

Grootaert, W.M., Millet, G.H., Worm, A.T., "Fluorocarbon Elastomers", Kirk–Othmer, *Encyclopedia of Chemical Technology*, 4$^{th}$ ed., vol. 8, pp 990–1005, John Wiley & Sons, New York (1993).

"Organic Fluorine Compounds", Kirk–Othmer, *Encyclopedia of Chemical Technology*, vol. 11, pp 20, 21, 32, 33, 40, 41, 48, 50, 52, 62, 70 and 71, John Wiley & Sons, New York (1980).

*Primary Examiner*—Vivian Chen
(74) *Attorney, Agent, or Firm*—James V. Lilly

(57) ABSTRACT

A method for increasing the adhesion of a first layer comprising a vinylidene fluoride containing fluoropolymer to a second layer comprising a curable elastomer is described. The method comprises adding a dehydrofluorinating composition to the curable elastomer, contacting the layers and curing the layered article so formed. The resulting multilayer compositions and articles are also disclosed.

10 Claims, No Drawings

COMPOSITIONS FOR BONDING FLUOROPLASTICS

This application claims priority to U.S. Provisional Patent Application No. 60/068,321 filed Dec. 19, 1997.

FIELD OF THE INVENTION

This invention relates to multilayer compositions comprising a fluoropolymer and curable elastomers. In another aspect, this invention relates to the use of certain epichlorohydrin (ECO) and nitrile-butadiene (NBR) elastomer compositions for improved bonding to vinylidene fluoride containing fluoropolymer materials.

BACKGROUND OF THE INVENTION

Fluorine-containing polymers (i.e., fluoropolymers or fluorinated polymers), are an important class of polymers that include, for example, fluoroelastomers and fluoroplastics. Among this broad polymer class are polymers of high thermal stability, polymers of extreme toughness, and polymers exhibiting usefulness along a broad range of temperatures. Many of these polymers also are almost totally insoluble in a wide variety of organic solvents; see, for example, F. W. Billmeyer, *Textbook of Polymer Science*, 3rd ed., pp. 398–403, John Wiley & Sons, New York (1984).

Fluoroelastomers, particularly the copolymers of vinylidene fluoride with other ethylenically unsaturated halogenated monomers such as hexafluoropropene, find particular utility in high temperature applications, such as in seal gaskets and linings. See, for example, Brullo, R. A., "Fluoroelastomer Rubber for Automotive Applications," *Automotive Elastomer & Design*, June 1985, "Fluoroelastomers Seal Up Automotive Future," *Materials Engineering*, October 1988, and Grootaert, W. M., Millet, G. H., Worm, A. T., "Fluorocarbon Elastomers," Kirk-Othmer, *Encyclopedia of Chemical Technology*, 4th ed., Vol. 8, pp. 990–1005, John Wiley & Sons, New York (1993).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, as wire coatings, electrical components, seals, and in solid and lined pipes and piezoelectric detectors. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, and 71, John Wiley & Sons, New York (1980).

Multilayer constructions containing a fluorinated polymer enjoy wide industrial application; multilayer fluoropolymer constructions find utility in, for example, fuel line hoses and related containers and hoses or gaskets in the chemical processing field. Increased concerns with evaporative fuel standards give rise to a need for fuel system components that have increased barrier properties to minimize the permeation of fuel vapors through automotive components, such as fuel filler lines, fuel supply lines, fuel tanks, and other components of the engine's fuel or vapor recovery systems. Various types of tubing have been proposed to address these concerns.

Adhesion between the layers of a multilayered article may need to meet various performance standards depending on the use of the finished article. A variety of methods can be used to increase the adhesion between a fluorinated polymer layer and a non-fluorinated polymer layer. An adhesive layer can, for example, be added between the two polymer layers. U.S. Pat. No. 5,047,287 (Horiuchi et al.) discloses a diaphragm, suitable for use in automotive applications, that comprises a base fabric having bonded to at least one surface a fluororubber layer by an adhesive that includes an acrylonitrile-butadiene or acrylonitrile-isoprene rubber having an amino group. Blends of the fluoropolymer and the non-fluorinated polymer layer themselves are in some cases employed as an intermediate layer to help bond the two layers together. European Patent Application 0523644 (Kawashima et al.) discloses a plastic laminate having a polyamide resin surface layer and a fluororesin surface layer. The reference recognizes the difficulties encountered when making laminates having a polyamide layer and a fluororesin layer because of the incompatibility of the two materials. The laminate of the reference is prepared by use of an intermediate layer composed of a blend of an aliphatic polyamide resin with a fluorine-containing graft copolymer. U.S. Pat. No. 5,242,976 (Strassel et al.) discloses co-extruding vinylidene polyfluoride with an alkyl polymethacrylate and vinylidene polyfluoride composition.

Surface treatment of one or both of the layers sometimes is employed to aid bonding. Some, for example, have taught treating fluoropolymer layers with charged gaseous atmosphere and applying subsequently a layer of a second material, for example a thermoplastic polyamide. E.g., European Patent Applications 0185590 (Ueno et al.) and 0551094 (Krause et al.) and U.S. Pat. No. 4,933,060 (Prohaska et al.) and U.S. Pat. No. 5,170,011 (Martucci).

The addition of a primary amine containing unsaturated compound to a hydrocarbon elastomer layer is disclosed as a method for increasing the adhesion to a layer comprising fluoropolymer comprising interpolymerized units derived from vinylidene fluoride in U.S. Pat. No. 5,512,225 (Fukushi).

As the above discussion illustrates, the combined features of hydrocarbon elastomer compounds and fluoropolymer materials are a desirable combination. This patent addresses a means for improving the adhesion between these dissimilar polymers.

SUMMARY OF THE INVENTION

In one aspect, this invention relates to a method of bonding a fluoroplastic comprising interpolymerized units derived from vinylidene fluoride to a curable elastomer comprising the steps of: a) providing; (i) a fluoroplastic comprising interpolymerized units derived from vinylidene fluoride or those monomers that result in a polymer microstructure similar to a polymer derived from vinylidene fluoride, (ii) a curable elastomer, and (iii) a dehydrofluorinating composition; b) forming a mixture comprising the curable elastomer and an effective amount of the dehydrofluorinating composition; c) contacting the mixture with the fluoroplastic to form a multilayer article; and d) curing the multilayer article for a time and at a temperature sufficient to provide an interlayer adhesion between the curable elastomer layer and the fluoroplastic layer of a higher value than without the dehydrofluorinating composition.

In another aspect, this invention relates to a layered article comprising a first layer comprising a fluoroplastic comprising interpolymerized units derived from vinylidene fluoride or those monomers that result in a polymer microstructure similar to a polymer derived from vinylidene fluoride, said first layer is in substantial contact with a second layer comprising a mixture of a curable elastomer and a dehydrofluorinating composition. Such layered articles may include films, gaskets, tubes or hoses, and containers.

The layers discussed herein are intended to include the concept of a surface, such as that found when constructing a multilayered hose or other shaped article and not intended to be limited to flat shapes. Thus, a first layer or surface may be formed or shaped prior to application of the second material. The substantial contact of the second material to the first is to a surface of the first material. Either the fluoropolymer component or the curable elastomer component may be formed or shaped first. When a shaped article, such as a hose, is formed, either material may be on the inside or the outside of the article depending upon the intended use, such as where the temperature resistance or chemical resistance is most needed.

Curable elastomers may be selected from the group consisting of epichlorohydrin-containing elastomers, nitrile-butadiene rubbers, fluorinated elastomers, silicone-containing elastomers, ethylene propylene diene monomer-containing elastomers and combinations thereof.

Specific dehydrofluorinating compositions may be selected from the group consisting of organo-oniums, amidines, such as 1,8-diazabicyclo[4.3.0]undec-7-ene (DBU) and 1,5-diazabicyclo[4.3.0]non-5-ene(DBN), salts of amidines and combinations thereof.

A fluoroplastic which is a copolymer comprising interpolymerized units derived from vinylidene fluoride, hexafluoropropylene and tetrafluoroethylene is useful in this invention. Blends or mixtures of such copolymers comprising interpolymerized units of vinylidene fluoride with copolymers not containing such units are also useful.

DETAILED DESCRIPTION

Curable elastomers useful in this case include those cured by a variety of curing agents. Such curing agents include peroxides or other free radical initiators, polyhydroxyl-containing compounds (e.g. polyphenols), polyamines and sulfur or sulfur-containing curatives, for example. Such elastomers include epichlorohydrin-containing compounds, nitrile-butadiene rubbers, ethylene propylene diene copolymers, chlorinated polyolefins (e.g., chlorinated polyethylene, chlorosulfinated polyethylene, etc.), silicone-containing elastomers and fluoroelastomers.

In the practice of this invention, the polyepichlorohydrin gum (A) is a solid, predominantly amorphous, high molecular weight (i.e. greater than about 40,000 number average molecular weight) epichlorohydrin homopolymer gum, copolymer gums of epichlorohydrin with other cyclic ethers (for example, ethylene oxide, propylene oxide, 2-butene oxide, ethyl glycidyl ether, and trimethylene oxide), or copolymers and terpolymers with other cyclic ethers which also may allow for ethylenic unsaturation. Generally useful copolymer gums will contain about 50 mole % of epichlorohydrin gum. Representative polyepichlorohydrins useful in this invention are described in U.S. Pat. Nos. 3,158,580, 3,158,581, and 3,726,841. Readily available commercial polymer gums include Hydrin H homopolymers, Hydrin C copolymers, and Hydrin T terpolymers (ZEON, Louisville, Ky.).

Additives useful in the curing of the ECO composition include imidazolines, diamines, internal salts of diamines, thioureas and polyphenol curing agents as discussed in U.S. Pat. No. 4,287,322 (Worm), incorporated herein by reference.

Other hydrocarbon elastomers useful in this invention are natural rubbers or synthetic rubbers derived from diene monomers. Particularly useful synthetic elastomers are nitrile-butadiene rubbers (NBR) and ethylene propylene diene terpolymers which are sulfur or peroxide curable. Nitrile-butadiene rubbers include high molecular weight, amorphous, copolymers of 1,3-butadiene ($CH_2$=CH—CH=$CH_2$) and acrylonitrile ($CH_2$=CH—CN). Suitable butadiene-acrylonitrile copolymers generally have acrylonitrile contents of from 5 to 65% by weight, preferably from 10 to 45 by weight, and butadiene contents of from 35 to 95% by weight, preferably from 55 to 90% by weight.

NBRs also include hydrogenated NBRs in which some of the butadiene unsaturation is selectively hydrogenated. High temperature properties are generally superior because of this reduction in unsaturation. Commercially available hydrogenated NBRs include Zetpol™ 2000 rubber available from Zeon Chemical, Inc.

Blends of NBRs are also useful, such as the NBR/PVC blend commercially available from Miles, Inc., as Krynac™ NV850 blend.

Useful ethylene propylene diene terpolymers (EPDM) contain dienes such as 1,4-hexadiene, dicyclo pentadiene, ethylidene norbornene. Commercially available ethylene propylene diene terpolymers include EPsyn™ 5206 terpolymer, available from Copolymer & Rubber Chemical Corp.

Suitable fluorine-containing ethylenically unsaturated monomers for use in the preparation of the curable fluoroelastomers useful in this invention include the terminally unsaturated monoolefins typically used for the preparation of fluorine-containing polymers such as hexafluoropropene (HFP), chlorotrifluoroethylene, 2-chloropentafluoropropene, perfluoroalkyl vinyl ethers, e.g., $CF_3OCF$=$CF_2$ or $CF_3CF_2OCF$=$CF_2$, tetrafluoroethylene (TFE), 1-hydropentafluoropropene, 2-hydropentafluoropropene, dichlorodifluoroethylene, trifluoroethylene, 1,1-dichlorofluoroethylene, vinylidene fluoride, vinyl fluoride, and mixtures thereof Fluorine-free terminally unsaturated monoolefin comonomers, e.g., ethylene or propylene may also be used as comonomers. Cure site monomers may be required depending upon the cure system selected.

Suitable silicone or fluorosilicone elastomers are described in U. S. Pat. No. 5,081,172 incorporated herein by reference. Such materials are generally known as diorgano siloxanes. When such materials are fluorine-containing, a fluorosilicone is obtained.

Useful dehydrofluorinating compositions include one or more organo-onium compounds or one or more amidine compounds. These are incorporated into the curable elastomer material to improve the bonding characteristics to the fluoropolymer.

As is known in the art, an organo-onium is the conjugate acid of a Lewis base (e.g. phosphine, amine, ether, and sulfide) and can be formed by reacting said Lewis base with a suitable alkylating agent (e.g., an alkyl halide or acyl halide) resulting in an expansion of the valence of the electron donating atom of the Lewis base and a positive charge on the organo-onium compound. Many of the organo-onium compounds useful in the present invention contain at least one heteroatom, i.e., a non-carbon atom such as N, P, S, O, bonded to organic or inorganic moieties. One class of quaternary organo-onium compounds particularly useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the useful organo-onium compounds are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.) all of whose descriptions are herein incorporated by reference. Representative examples include the following individually listed compounds and mixtures thereof:

triphenylbenzyl phosphonium chloride,
tributylallyl phosphonium chloride,
tributylbenzyl ammonium chloride,
tetrabutyl ammonium bromide,
triphenyl sulfonium chloride,
tritolyl sulfonium chloride,
8-benzyl-1,8-diazabicyclo [5.4.0]-7-undecenium chloride,
benzyl tris(dimethylamino) phosphonium chloride and
benzyl(diethylamino)diphenylphosphonium chloride.

A commercial source of a useful dehydrofluorinating composition is Dynamar™ Rubber Chemical FX-5166 which contains an organo onium. It is available from Dyneon LLC of Oakdale, Minn. An effective amount of an organo onium is that amount, usually stated in parts per hundred rubber (phr), necessary to give improved interlayer adhesion when compared to a composition without any organo onium. This will generally be between 0.25 to 7 phr. A preferred level is between 0.5 to 5 phr.

Also useful as dehydrofluorinating compositions are amidine base compounds, such as 1,8-diazabicyclo[4.3.0] undec-7-ene(DBU) and 1,5-diazabicyclo[4.3.0]non-5-ene (DBN) and salts thereof. Examples of DBU salts include salts of 1,8-diazabicyclo[5.4.0]undecene-7 with carbonates, long chain fatty acids, carboxylates, aromatic sulfonates or carboxylates, phenol salts, thiolic salts, etc. Typical examples are DBU-carbonate, DBU-stearate, DBU-naphthoate, DBU-P-hydroxy-benzoate, DBU-P-toluene-sulfonate, etc. Also included are unsubstituted or substituted phenol salts of 1,8-diazabicyclo-[5.4.0]undecene-7. Examples of such compounds include the phenol salt of 1,8-diazabicyclo-[5.4.0]undecene-7, the cresol salts of 1,8-diazabicyclo-[5.4.0]undecene-7, resorcinol salts of 1,8-diazabicyclo-[5.4.0]undecene-7 and hydroquinone salts of 1,8-diazabicyclo-[5.4.0]undecene-7. A commercial source of useful amidine-containing dehydrofluorinating compositions includes SANAPRO VCAT SA102 DBU-octanoic acid salt and VCAT SA841 DBU/phenol novolac resin salts. (Sanapro Limited, Tokyo Japan). An effective amount of an amidine which is useful is that amount necessary to give improved interlayer adhesion when compared to a composition without any amidine. This will generally be between 0.25 to 7 phr. A preferred level is between 0.5 to 3.0 phr.

Such improvement in interlayer adhesion should be at least 2 Newtons/cm of width and preferably the improvement should be at least 5 Newtons/cm of width.

Acid acceptors can also be added prior to curing. Suitable acid acceptors include, for example, magnesium oxide, lead oxide, calcium oxide, calcium hydroxide and dibasic lead phosphite. Mixtures of more than one acid acceptor may be used in this invention.

Methods of incorporation of the dehydrofluorinating composition and the other required additives into the curable elastomer compounds include any of the usual rubber mixing devices, such as internal mixers, e.g. Banbury mixers, roll mills, or any other convenient mixing device. It has been found that a two-roll rubber mill equipped with heat exchange means, e.g., cored chambers for cooling, is particularly suitable since the heat generated by the high shearing forces in mixing can be dissipated and the temperature more accurately regulated with this device than with devices providing other means for temperature control. The temperature during mixing generally should not be allowed to rise above about 120° C. The mixture should be processed sufficiently to distribute the cross-linking agents and other ingredients throughout the gum stock. About 5 to 20 minutes or longer is recommended for this process.

The solubility in the curable elastomer of the material selected as the dehydrofluorinating composition may affect the quantity required to reach a useful adhesion level. A higher solubility is thought to require a lower additive level and thus may be preferred.

Fluoropolymer materials may be described by broadly categorizing the fluoropolymers structurally into one of two basic classes. A first class includes those fluorinated homopolymers or copolymers comprising interpolymerized units derived from vinylidene fluoride (VDF) or monomers which give a similar polymer micro structure. This first class of fluoropolymers comprises both fluoroelastomers and fluoroplastics. The second class includes those fluoropolymers which do not contain any significant level of such micro structure. For the purpose of this discussion, a copolymer is defined as a polymeric material resulting from the simultaneous polymerization of two or more dissimilar monomers and a homopolymer is a polymeric material resulting from the polymerization of a single monomer.

The fluoropolymers useful in this invention include those fluoroplastics described in the first class above and include copolymers derived from vinylidene fluoride or monomers similar to VDF. Similar monomers in this sense means those monomers other than VDF which, when polymerized, form monomer sequences similar to polymerized vinylidene fluoride. In general, these fluoroplastics will readily dehydrofluorinate when exposed to a base. As a result, such fluoroplastics undergo relatively facile adhesion promoting reactions. These other such monomers include ethylenically unsaturated monomers which, when incorporated into fluoropolymers, can produce a similar (including an identical) polymeric microstructure as the polymerized VDF. These similarly formed polymers are also prone to dehydrofluorination and subsequent adhesion promoting reactions. In general, the microstructure of a hydrogen bonded carbon atom between fluorine bonded carbon atoms creates a site reactive to a base. The reactivity of a hydrogen bonded carbon is further enhanced when its carbon atom is adjacent to, or attached to a carbon atom possessing a carbon bonded —$CF_3$ group (supplied by HFP or 2-hydropentafluoropropylene for instance) or another strongly electron withdrawing group. Monomers suitable for forming such hydrogen bonded carbon reactive sites include, but are not limited to, VDF, 1-hydropentafluoropropene, 2-hydropentafluoropropene, and trifluoroethylene.

Such VDF-containing fluoroplastics comprise at least 3% by weight of interpolymerized units derived from VDF or other monomers with similar reactivity when polymerized. These VDF-containing fluoroplastics may be homopolymers or copolymers with other ethylenically unsaturated monomers. More preferably, the VDF-containing fluoroplastic is formed from (i) a fluorine-containing monomer selected from the group of vinylidene fluoride, trifluoroethylene, 1-hydropentafluoropropylene, 2-hydropentafluoropropylene, mixtures thereof, and optionally (ii) at least one monomer copolymerizable therewith.

Such VDF-containing fluoroplastics (homopolymers, copolymers, terpolymers, etc.) can be made by well-known conventional means, for example by, free-radical polymerization of VDF with or without other ethylenically unsaturated monomers. The preparation of colloidal, aqueous dispersions of such polymers and copolymers is described, for example, in U.S. Pat. No. 4,335,238 (Moore et al.). Customary processes for making such fluoroplastics can include copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid.

These VDF-containing fluoroplastics useful in this invention can optionally include other useful fluorine-containing monomers such as hexafluoropropene (HFP), tetrafluoroethylene (TFE), chlorotrifluoroethylene (CTFE), 2-chloropentafluoro-propene, a fluorinated vinyl ether, including a perfluoroalkyl vinyl ether such as $CF_3OCF=CF_2$ or $CF_3\ CF_2\ CF_2OCF=CF_2$. Certain fluorine-containing di-olefins are also useful, such as, perfluorodiallyether and perfluoro-1,3-butadiene. In one preferred embodiment, the VDF-containing fluoroplastic comprises a hexafluoropropylene-vinylidene fluoride polymer. A second preferred embodiment is a copolymer derived from VDF, HFP and TFE monomers.

The VDF-containing fluoroplastics useful in this invention may also comprise interpolymerized units derived from fluorine-free, unsaturated olefin comonomers, e.g., ethylene, propylene or butadiene. Preferably, at least 50% by weight of all monomers in a polymerizable mixture are fluorine-containing. The VDF-containing monomer may also be copolymerized with iodine- or bromine-containing unsaturated olefin monomer. These monomers, sometimes referred to as cure-site monomers, are useful to prepare a peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-1-butene.

Useful commercially available VDF-containing fluoroplastic materials include, for example, THV 200, THV 400, THV 500G fluoropolymer (available from Dyneon LLC, St. Paul, Minn.), KYNAR 740 fluoropolymer (available from Atochem North America, Philadelphia, Pa.), and HYLAR 700 (available from Ausimont USA, Inc., Morristown, N.J.). Blends or mixtures of such above described VDF-containing fluoroplastics with fluoropolymers or copolymers which do not contain VDF monomer units are also useful, provided the quantity of VDF-containing materials are sufficient to provide the desired level of improved interlayer adhesion.

Methods known in the fluoropolymer art can be used to produce a bonded multilayer article wherein the first fluoroplastic material is in substantial contact with the curable elastomer material. For instance, the first fluoroplastic and the curable elastomer can be formed into thin film layers by known methods. The first fluoroplastic layer and the curable elastomer layer can then be laminated together under heat and/or pressure to form a bonded, multilayer article. Alternatively, the first fluoroplastic and the curable elastomer, along with one or more additional layers where desired, can be co-extruded into a multilayer article. See e.g., U.S. Pat. Nos. 5,383,087, and 5,284,184, whose descriptions are incorporated herein by reference for such purpose.

The heat and pressure of the method by which the layers are brought together (e.g., coextrusion or lamination) may be sufficient to provide adequate adhesion between the layers. It may, however, be desirable to further treat the resulting multilayer article, for example with additional heat, pressure, or both, to provide further adhesive bond strength between the layers. One way of supplying additional heat when the multilayer article is prepared by extrusion is by delaying the cooling of the multilayer article after co-extrusion. Alternatively, additional heat energy may be added to the multilayer article by laminating or co-extruding the layers at a temperature higher than necessary for merely processing the several components. Or, as another alternative, the finished multi-layer article may be held at an elevated temperature for an extended period of time. For example the finished multilayer article may be placed in a separate means for elevating the temperature of the article, such as an oven or heated liquid bath. A combination of these methods may also be used.

A cure step may be desired or necessary to establish fully the desired physical properties in the elastomer component of any finished article. Such cure step may include exposure to an elevated temperature, such as an autoclave treatment. This step may be in addition to the thermal exposure of the other process steps, e.g. lamination or coextrusion. Conditions may be found which accomplish both the melt processing and curing within the same temperature and pressure ranges.

Where the formation of a multi-layered article is a series of sequential steps, such as lamination of preformed sheets or multiple cross-head extrusions, an opportunity exists to treat the surface of one or both materials prior to forming the layered article. A lamination of preformed sheets allows one or more surface treatments on either or both materials before lamination. A cross-head extrusion process will allow one or more surface treatments on the material formed first, before the application of the second material.

Such surface treatments may consist of a solution treatment, such as a solvent. If the solvent contains a base, such as 1,8-diaza[5.4.0]bicyclo undec-7-ene (DBU), treatment of the fluoroplastic will result in some degree of dehydrofluorination. Such dehydrofluorination is thought to be beneficial to promote adhesion to subsequently applied materials. This is particularly true when a subsequently applied material contains any agent which is reactive to sites of unsaturation, such as that created by dehydrofluorination.

Other methods of surface treatment include charged atmosphere treatments, such as corona discharge treatment or plasma treatment. Also useful are Electron beam treatment (E-beam). Such E-beam treatments may also be useful to promote the cure desired in the elastomer component. This step would preferably take place after the article is formed.

The methods of the present invention provide multilayer articles exhibiting ease of processability and improved interlayer adhesive bond strength between a fluoroplastic layer and a curable elastomer. Multilayer articles of the present invention can have usefulness as films, containers, or tubing that require specific combinations of barrier properties, high and low temperature resistance, and chemical resistance and will further benefit from improved interlayer adhesion. The methods and compositions of this invention are particularly useful for making multilayer articles suitable for use in motor vehicles, for example as fuel-line hoses, and for films and blow-molded articles such as bottles, where chemical resistance and barrier properties related to fuels and vapors are important.

The multilayer articles of the present invention can have two, three, or even more separate layers. For example, the present invention contemplates a multilayer article including a fluoroplastic layer, a curable elastomer layer, and optionally further comprising one or more additional layers comprising fluorinated or non-fluorinated polymers. As a specific example, a bi-layer article can be prepared according to the present invention, the bi-layer article comprising a fluoroplastic layer and an epichlorohydrin-containing (ECO) layer, wherein the described organo onium component is mixed into the ECO containing layer. One or more additional layers comprising a fluorinated or non-fluorinated polymer can, either thereafter or simultaneously (i.e., to form a tri-layer article), be bonded to one or more of the fluoroplastic layer or the epichlorohydrin containing layer, to produce a multilayer article having three or more layers.

EXAMPLES

In the following Examples and Comparative Examples various multilayer articles were prepared and the adhesion between the layers was evaluated. All concentrations are by weight based on weight of curable elastomer (phr) unless otherwise indicated.

Example 1

In Example 1, a 0.1 Kg sample of epichlorohydrin elastomer compound was prepared using conventional methods with a two-roll mill by compounding Hydrin™ C2000L epichlorohydrin rubber (ECO), available from Zeon, Inc., with 98 phr N-990 Carbon Black, 1.0 phr stearic acid (EM Science) 1.0 phr nickel diisobutyldithiocarbamate (NBC), 1.0 phr nickel dimethyldithiocarbamate (NMC), both available from Vanderbilt, 5 phr Dyphos (Associated Lead Inc.), 0.5 phr Sulfasan (Monsanto), and 1.0 phr ethylene thiourea (Aldrich Chemical). To this compound was added 5.0 phr calcium hydroxide powder (C. P. Hall) and 3.0 phr FX-5166, an organo phosphonium-containing rubber curative compound available from Dyneon LLC.

A sheet about 2.5 mm thick was formed from the ECO compound by using a two-roll mill. Composite samples were prepared with the ECO compound and a 375 micron thick film of a copolymer of tetrafluoroethylene (TFE), hexafluoropropylene (HFP) and vinylidene fluoride (VDF), made from resin available from Dyneon LLC as THV 500.

The adhesion between the layers was tested using ASTM D-1876, commonly known as a "T-peel" test. To facilitate testing, a piece of 75 micron polyester (PET) film coated with a silicone release agent was placed between the ECO compound and the THV layer along one edge. The release-coated PET film was inserted about 1.25 cm along the short edge of the 2.54 cm by 7.62 cm (1 inch by 3 inch) sample. The sheet of polyester did not adhere to either of the layers and was used only to create a THV "tab" and a ECO "tab" to insert into the jaws of the test device.

The resulting 2.54 cm by 7.62 cm composites were heated under pressure using a Wabash Hydraulic Press Co. heated platen press at 160° C. (320° F.) and 0.7 MPa (100 psi) for 45 minutes. The samples were removed from the press and allow to cool to room temperature. Peel strength or adhesion was measured on the strips in accordance with ASTM D 1976 (T-Peel Test). An Instron™ Model 1125 tester, available from Instron Corp., set at a 10.16 cm/min (4 inch/min) crosshead speed was used as the test device. The peel strength was calculated as the average load during testing, and the value reported was the average of the samples. The average peel strength on the strips from Example 1 is reported in Table 1.

Comparative Example C1

In Comparative Example C1, a sample was prepared and tested as in Example 1 except no FX-5166 nor calcium hydroxide was added to the ECO compound. The tests results are reported in Table 1.

Example 2

In Example 2, a 0.1 Kg sample of epichlorohydrin elastomer compound was prepared using conventional methods with a two-roll mill by compounding Hydrin™ C2000L epichlorohydrin rubber (ECO), available from Zeon, Inc., with 98 phr N-990 Carbon Black, 1.0 phr stearic acid, 1.0 phr NBC, 1.0 phr NMC, 5 phr Dyphos and 1.0 phr FC-5157, a 4-4' sulfonyl bisphenol rubber curative compound available from Dyneon LLC. To this compound was added 5.0 phr calcium oxide powder (C. P. Hall) and 3.0 phr FX-5166.

A composite sample of this ECO compound with THV 500 was prepared and tested as in Example 1. The results are reported in Table 1.

Example 3

In Example 3, a 0.1 Kg sample of epichlorohydrin elastomer compound was prepared using conventional methods with a two-roll mill by compounding Hydrin™ C2000L epichlorohydrin rubber (ECO), available from Zeon, Inc., with 98 phr N-990 Carbon Black, 1.0 phr stearic acid (EM Science) 1.0 phr nickel diisobutyldithiocarbamate (NBC), 1.0 phr nickel dimethyldithiocarbamate (NMC), both available from Vanderbilt, 5 phr Dyphos (Associated Lead Inc.), 0.5 phr Sulfasan (Monsanto), and 1.0 phr ethylene thiourea (Aldrich Chemical). To this compound was added 1.5 phr of 1,5diazabicyclo[4.3.0]non-5-ene (DBN) available from Aldrich Chemical. Composite samples were prepared and tested as in Example 1. Test results for Example 3 are reported in Table 1.

TABLE 1

Summary of Peel Test Results

| Example # | ECO Composition | Fluoroplastic | Peel (Newtons/cm of width) |
|---|---|---|---|
| 1 | ETU curative + FX-5166 + calcium hydroxide | THV 500 | 33.3 |
| C1 | ETU curative | THV 500 | 10.8 |
| 2 | Bisphenol curative + FX-5166 + calcium oxide | THV 500 | 35.3 |
| 3 | ETU curative + DBN | THV 500 | 35.3 |

The results in Table 1 show the improvement obtained when using compositions of the invention.

Example 4

In Example 4, a 0.1 Kg sample of sulfur curable nitrile rubber compound was prepared using conventional methods with a two-roll mill by compounding Nipol™ 1052 acrylonitrile butadiene rubber (NBR), available from Zeon, Inc., with 44 phr N-990 Carbon Black, 1.0 phr nickel diisobutyldithiocarbamate (NBC) (Vanderbilt), 2.0 phr 2-mercaptobenzothiazole (MBT) (Monsanto), 1.0 phr tetramethylthiuram monosulfide (TMTM) (Monsanto) and 1.0 phr sulfur (Fisher Scientific). To this compound was added 2.2 phr 1,8-diazabicyclo[5.4.0]undec-7-ene (DBU) (Aldrich) and 2.2 phr Dynamar™ PPA-791, rubber processing agent available from Dyneon LLC.

A sheet about 2.5 mm thick was formed from the NBR compound by using a two-roll mill. Composite samples were prepared with the NBR compound and a 375 micron thick film of a terpolymer of tetrafluoroethylene (TFE), hexafluoropropylene (HFP) and vinylidene fluoride (VDF), made from resin available from Dyneon LLC as THV 500.

The adhesion between the layers was tested using ASTM D-1876, commonly known as a "T-peel" test. To facilitate testing, a piece of 3 mil polyester (PET) film coated with a silicone release agent was placed between the NBR compound and the THV layer along one edge. The release-coated PET film was inserted about 1.25 cm along the short edge of the 2.54 cm by 7.62 cm (1 inch by 3 inch) sample. The sheet of polyester did not adhere to either of the layers and was used only to create a THV "tab" and a NBR "tab" to insert into the jaws of the test device.

The resulting 2.54 cm by 7.62 cm composites were heated under pressure using a Wabash Hydraulic Press Co. heated platen press at 160° C. (320° F.) and 0.7 MPa (100 psi) for 45 minutes. The samples were removed from the press and allowed to cool to room temperature. Peel strength or adhesion was measured on the strips in accordance with ASTM D 1976 (T-Peel Test). An Instron™ Model 1125 tester, available from Instron Corp., set at a 4 inch/min crosshead speed was used as the test device. The peel strength was calculated as the average load during testing, and the value reported was the average of the samples. The average peel strength on the strips from Example 4 is reported in Table 2.

Comparative Example C2

In Comparative Example C2, a sample was prepared and tested as in Example 4 except no DBU or PPA 791 was added to the NBR compound. The tests results are reported in Table 2.

Example 5

In Example 5, a 0.1 Kg sample of sulfur curable nitrile rubber compound was prepared using conventional methods with a two-roll mill by compounding Nipol™ 1052 acrylonitrile butadiene rubber (NBR), available from Zeon, Inc., with 44 phr N-990 Carbon Black, 1.0 phr nickel diisobutyldithiocarbamate (NBC), 2.0 phr 2-mercaptobenzothiazole (MBT), 1.0 phr tetramethylthiuram monosulfide (TMTM) and 1.0 phr sulfur. To this compound was added 2.2 phr 1,5-diazabicyclo[4.3.0]non-5ene (DBN) (Aldrich) and 2.2 phr 2-Napthol (Aldrich).

A composite sample of this NBR compound with THV 500 was prepared and tested as in Example 4. The results are reported in Table 2.

Example 6

In Example 6, a 0.1 Kg sample of peroxide curable nitrile rubber compound was prepared using conventional methods with a two-roll mill by compounding Nipol™ 1052 acrylonitrile butadiene rubber (NBR), available from Zeon, Inc., with 44 phr N-990 Carbon Black, 3.0 phr Maglite D (Merck & Co.), 3.0 phr calcium oxide (C. P. Hall), 3.5 phr Luberco™ 101XL (Elf Atochem North America Inc.), 1.0 phr N,N'-m-phenylenedimaleimide (HVA-2) (Dupont) and 0.5 phr triallyl isocyanurate (TAIC) (American Cyanamid Co.). To this compound was added 1.4 phr 1,8-diazabicyclo [5.4.0]undec-7-ene (DBU) and 1.4 phr stearic acid (EM Science).

Composite samples of this NBR compound and THV 500 were prepared and tested as in Example 4. The test results are reported in Table 2.

Comparative Example C3

In Comparative Example C3, a sample was prepared and tested as in Example 6 except that no DBU or Stearic Acid was added to the NBR compound. Test results are reported in Table 2.

Example 7

In Example 7, a composite sample was prepared and tested as in Example 6 except that 1.4 parts 1,5-diazabicyclo [4.3.0]non-Sene (DBN) was used in place of DBU. Test results are reported in Table 2.

Example 8

In Example 8, a 0.1 Kg sample of peroxide curable nitrile rubber compound was prepared using conventional methods with a two-roll mill by compounding Nipol™ 1052 acrylonitrile butadiene rubber (NBR), available from Zeon, Inc., with 44 phr N-990 Carbon Black, 3.0 phr Maglite D (Merck & Co.), 3.0 phr calcium oxide (C. P. Hall), 3.5 phr Luberco™ 101XL (Elf Atochem North America Inc.), 1.0 phr N,N'-m-phenylenedimaleimide (HVA-2) (Dupont) and 0.5 phr triallyl isocyanurate (TAIC) (American Cyanamid Co.). To this compound was added 3.3 phr of ZEONET PB™, said to be a benzotriazolate phosphonium (Zeon Chemical, Louisville, Ky.) and 8.3 phr calcium hydroxide (C. P. Hall).

Composite samples of this NBR compound and THV 500 were prepared and tested as in Example 4. The test results are reported in Table 2 which shows the relevant additives as well as the interlayer adhesion results.

TABLE 2

Summary of Peel Test Results

| Example # | NBR Composition | Fluoroplastic | Peel (Newtons/cm of width) |
|---|---|---|---|
| 4 | S curative + DBU | THV 500 | 35.3 |
| C2 | S curative | THV 500 | No Bonding |
| 5 | S curative + DBN | THV 500 | 34.3 |
| 6 | Peroxide curative + DBU | THV 500 | 21.6 |
| C3 | Peroxide curative | THV 500 | No Bonding |
| 7 | Peroxide curative + DBN | THV 500 | 10.8 |
| 8 | Peroxide curative + ZEONET PB ™ | THV 500 | 41.2 |

The results in Table 2 show the improvement in adhesion values when using compositions of the invention. No Bonding indicates the samples delaminated when they were inserted in the test device.

What is claimed is:

1. A layered article comprising a first layer comprising a dehydrofluorinated fluoroplastic polymer comprising interpolymerized units derived from vinylidene fluoride or ethylenically unsaturated monomers that result in a polymer microstructure of a hydrogen bonded carbon atom between fluorine bonded carbon atoms to create a site reactive to a base, or a combination thereof, said first layer is in contact with a second layer comprising a mixture of a curable elastomer and a dehydrofluorinating composition that is selected from the group consisting of organo-oniums, amidines, salts of amidines, and combinations thereof.

2. A layered article according to claim 1 wherein the article is a film, a gasket, a hose or a container.

3. A layered article according to claim 1 wherein the curable elastomer is selected from the group consisting of epichlorohydrin, nitrile butadiene rubbers, fluorinated elastomers, silicones and ethylene propylene diene copolymers, chlorinated polyethylene and chlorosulfinated polyethylene, and combinations thereof.

4. A layered article according to claim 1 wherein the fluoroplastic polymer comprises a copolymer of vinylidene fluoride, hexafluoropropylene and tetrafluoroethylene.

5. A layered article according to claim 4 wherein the fluoroplastic polymer further comprises a non-vinylidene fluoride-containing fluoropolymer.

6. A method of bonding a fluoroplastic comprising interpolymerized units derived from vinylidene fluoride to a curable elastomer comprising the steps of:
   a) providing; (i) a fluoroplastic polymer comprising interpolymerized units derived from vinylidene fluoride, (ii) a curable elastomer, and (iii) a dehydrofluorinating composition selected from the group consisting of organo-oniums, amidines, salts of amidines, and combinations thereof,
   b) forming a mixture comprising the curable elastomer and an effective amount of the dehydrofluorinating composition,
   c) contacting the mixture with the fluoroplastic polymer to form a multilayer article, and
   d) curing the multilayer article for a time and at a temperature sufficient to provide an interlayer adhesion between the curable elastomer layer and the fluoroplastic polymer layer which adhesion is greater than that obtained without such dehydrofluorinating composition.

7. A method according to claim 6 wherein the curable elastomer is selected from the group consisting of epichlorohydrin, nitrile butadiene rubbers, fluorinated elastomers, silicones and ethylene propylene diene copolymers, chlorinated polyethylene and chlorosulfinated polyethylene, and combinations thereof.

8. A method according to claim 6 wherein the fluoroplastic polymer comprises a copolymer of vinylidene fluoride, hexafluoropropylene and tetrafluoroethylene.

9. A method according to claim 8 wherein the fluoroplastic polymer further comprises a non-vinylidene fluoride-containing fluoropolymer.

10. A method according to claim 6 wherein at least one of the fluoroplastic polymer or the curable elastomer is subjected to one or more surface treatments prior to contacting them with each other to from the multilayer article.

* * * * *

UNITED STATES PATENT AND TRADEMARK OFFICE
CERTIFICATE OF CORRECTION

PATENT NO. : 6,270,901 B1
DATED : August 7, 2001
INVENTOR(S) : Edward E. Parsonage, Robert E. Kolb and Jerry L. Bymark It is certified that error appears in the above-identified patent and that said Letters Patent is hereby corrected as shown below:

Column 12,
Line 3, "[4.3.0]non-Sene" should read -- [4.3.0]non-5ene --

Column 14,
Line 19, "to from the multilayer article" should read -- to form the multilayer article --

Signed and Sealed this

Sixteenth Day of April, 2002

*Attest:*

JAMES E. ROGAN
*Attesting Officer*    *Director of the United States Patent and Trademark Office*